(No Model.)
F. A. HARDY.
APPARATUS FOR TESTING THE EYES.
No. 311,185. Patented Jan. 27, 1885.
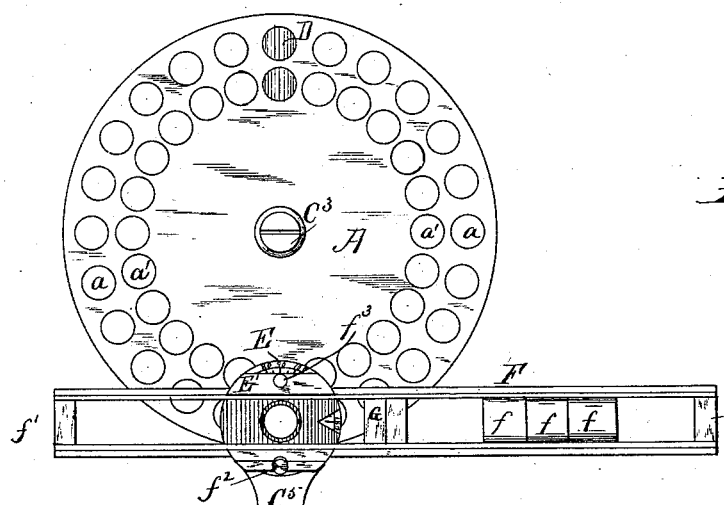
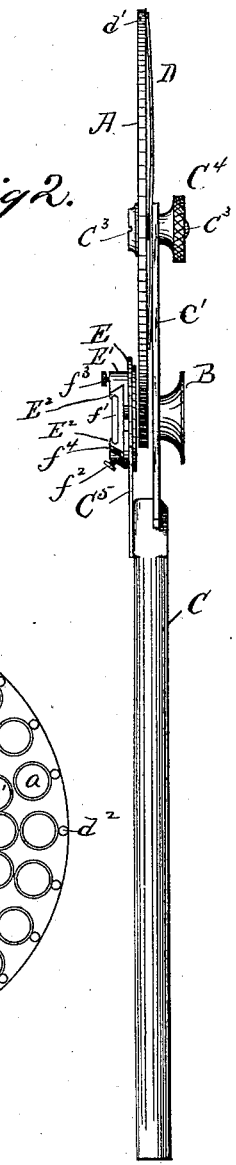
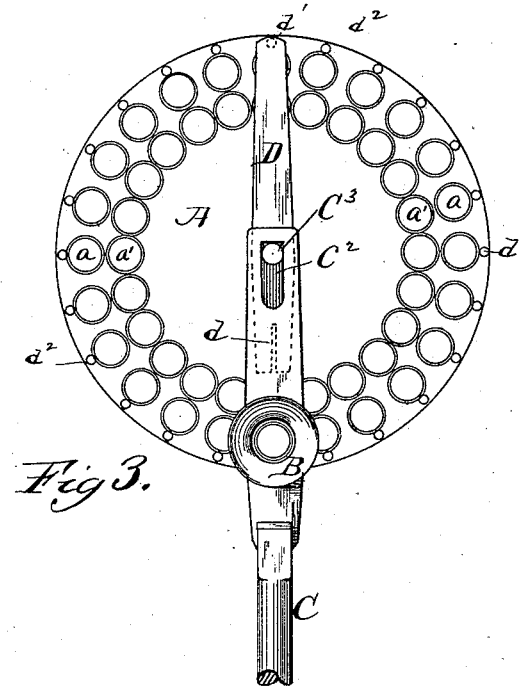
Witnesses:
Taylor E. Brown
Lew. E. Curtis
Inventor:
Francis A. Hardy
By Munday Evarts & Adcock
his Attorneys

UNITED STATES PATENT OFFICE.

FRANCIS A. HARDY, OF CHICAGO, ILLINOIS.

APPARATUS FOR TESTING THE EYES.

SPECIFICATION forming part of Letters Patent No. 311,185, dated January 27, 1885.

Application filed August 1, 1884. (No model.)

*To all whom it may concern:*

Be it known that I, FRANCIS A. HARDY, a citizen of the United States, residing at Chicago, in the county of Cook and State of Illinois, have invented a new and useful Improvement in Apparatus for Testing the Eyes, of which the following is a specification.

The invention relates to an improved method of arranging in a convenient manner a series of trial-lenses for the use of oculists and opticians in testing the sight and discovering the proper lens, or combination of lenses, needed for correcting its defects.

In the accompanying drawings, which form a part of this specification, Figure 1 represents a rear view of my apparatus. Fig. 2 is a side view of the same, and Fig. 3 a front view thereof with the slide removed.

Like letters of reference made use of in the several figures denote like parts wherever used.

The instrument, in the best form that I have so far devised, consists of a light flat circular disk, A, perforated near its margin with two concentric rows of apertures containing lenses having their surfaces spherically curved, the lenses in one row, $a$, being convex, and in the other row, $a'$, concave. The disk A, carrying the glasses $a a'$, is contrived that it may be rotated, so as to bring any one of the glasses opposite an eye-piece, B, as follows: The handle C has an extension, C', provided with a slot, $C^2$. A pivot, $C^3$, extends from the center of the disk through this slot, and is furnished with a retaining thumb-nut, $C^4$. By loosening the thumb-nut the disk may be pushed up or down in the slot, bringing at will either the inner or outer marginal row of glasses in line with the eye-piece. When the disk is pushed upward as far as the slot will permit—that is to say, until the pivot strikes the upper end of the slot—the outer row of marginal glasses will be in line with the eye-piece, and, contrariwise, when pushed down to its lower limit the inner row will be in line.

Interposed between the slotted extension C' and the adjacent surface of the disk is a flat metal spring-piece, D, held in place by the pivot $C^3$, which passes through it, and prevented from rotating with the disk by means of the slotted lower part, $d$, there being a short guide-pin (not shown in the drawings) projecting from the inner face of C' and entering this slot. The outer extremity of this spring-arm reaches to the periphery of the disk, and is near its end furnished with a small projection or rounded tooth. (Shown in dotted lines at $d'$ in Fig. 2.) This tooth takes into the cavities $d^2$, cut in the face of the disk, and acts as a detent, holding the disk from accidental rotation, but permitting it to revolve readily when enough force is applied to spring the detent out of the cavity. By means of this spring click or detent the glasses are always correctly centered, as well as held to position.

In addition to the above method of mounting the spherically-curved lenses in two concentric rows in one disk, I may use two disks, one for convex and the other for concave lenses, suitably arranged so that the one desired for use can be slipped into place on the frame. The eye-piece B is mounted on the extension C', which is perforated for that purpose. On the opposite side of the disk from the eye-piece projects from the handle another extension, $C^5$, on which is mounted a rotary carrier, to carry a slide containing cylindrical test-glasses and a stenopaic slit, useful in testing the eye for astigmatism. The carrier consists of the circular plate E, marked in degrees from 0 to 180, and perforated centrally for the vision. On this plate is mounted, to rotate thereon, a centrally-perforated plate, E', having ways $E^2$, fitted to receive a cross-slide, F. This cross-slide forms a frame grooved to receive a series of cylindrical lenses, $f$, having their axes all arranged in the same direction. A stop piece or pieces, $f'$, at the end or ends of the grooved frame, and which may be removed at pleasure, serves to hold said lenses from slipping out of the groove. A few of the cylindrical lenses are shown in place in the slide at one side only of Fig. 1, the remainder being omitted from the drawings to avoid confusing the lines. The sliding frame may be made long enough so that a single frame will hold a complete assortment of both convex and concave cylindrical glasses, in which case all of the convex lenses may be located at one end and all the concave at the other; but I find it more convenient to have separate slides for the two kinds to avoid weight, as the slides can be readily slipped in and out of place, as desired. A friction spring, $f^4$, serves to prevent too easy and free movement of the slide, and a set-screw, $f^2$, offers a means of fixing the same at any point in its length. A second set-screw, $f^3$, is for the purpose of fixing the rotary carriage at any angle desired. I provide, also, in connection with the rotary carriage, a device, termed by opticians a "stenopaic slit," and, for convenience, this may be mounted, like the lenses, in the sliding frame, as at G. It consists of a plain metal plate with a narrow slit cut therein, and is used by being rotated in front of the eye suspected of astigmatism. If the eye be astigmatic, the vision through the slit will become dim when a certain angle is given to the slit rotated in a plane perpendicular to the line of vision. This simple device thus not only indicates the presence of the defect, but at the same time denotes the angle or line of the axis of the malformation of the eye. I may also place in the cross-slide F a series of prismatic lenses, or may provide an extra cross-slide containing such a series.

It will be obvious that by means of the apparatus I have above described any single spherical, cylindrical, or prismatic lens, or the stenopaic slit, may be passed or placed at any angle in front of the eye stationed at the eye-piece B, or any combination possible to form of a spherical lens, together with a cylindrical or prismatic lens set at any angle, can be readily formed in front of the eye; or the spherical lenses can be readily passed between the eye and the stenopaic slit, in the manner customary to oculists, for the purpose of determining the degree of astigmatism after its existence and direction have been shown by the use of the slit separately.

The spherical convex glasses of the outer row of the disk may be tried one after another to suit an eye affected with hypermetropia, or with presbyopia, by simply revolving the series of graduated lenses in front of the eye-piece. So in like manner the inner row of spherical concave glasses may be used one after another to find the glass of strength to suit a case of myopia; and if astigmatism be suspected its presence and the angle can be determined by the stenopaic slit. For this purpose I prefer to have one of the holes in the disk A left vacant, or without a lens. After the angle of dimmest vision has been determined by the stenopaic slit and the carriage fixed at that angle by the set-screw $f^3$, the slide may be moved along, and its contained graduated series of cylindrical lenses may be passed in front of the eye and severally tried, both convex and concave, or either, to fix the extent and character of the defect; or, in lieu thereof, the stenopaic slit may be allowed to remain in front of the eye at the proper inclination thus determined, and the spherical lenses (either convex or concave) be rotated into position.

The apparatus is capable of being used conveniently and quickly for making most, if not all, of the tests required for fitting the eye with glasses, whatever be the character of the defect.

Having thus described my invention, I claim—

1. The combination, in an apparatus for testing the eye, of a series of spherical lenses mounted in a rotatable disk, so that they may severally be brought into line with the eye, and a series of cylindrical lenses mounted in a straight slide sliding in a set of ways or guide made rotatable concentrically with the line of sight, substantially as specified.

2. In an apparatus for testing the eye, the single disk A, provided with several series of spherical lenses, $a\ a'$, one series arranged concentric to the other, said disk being mounted to rotate on a frame which carries a single eye-piece, B, the disk and eye-piece being movable in relation to each other, substantially as specified, so that either series of lenses may at will be brought into line with said eye-piece.

3. The stenopaic slit contrived to be rotated in front of the eye, in combination with a series of spherical lenses arranged in a circle in a disk, to be brought one at a time into visual line with said slit, substantially as specified.

FRANCIS A. HARDY.

Witnesses:
F. F. WILCOX,
H. M. MUNDAY.